United States Patent [19]
Lloyd et al.

[11] Patent Number: 4,769,919
[45] Date of Patent: Sep. 13, 1988

[54] CONTACT-SENSING PROBE

[75] Inventors: Peter G. Lloyd, Bristol; David Wilson, Stonehouse; Stephen I. N. Gregorig, Stroud, all of United Kingdom

[73] Assignee: Renishaw plc, England

[21] Appl. No.: 36,475

[22] Filed: Apr. 9, 1987

[30] Foreign Application Priority Data

Apr. 17, 1986 [GB] United Kingdom ............... 8609350
Dec. 24, 1986 [GB] United Kingdom ............... 8630836

[51] Int. Cl.⁴ .............................................. G01B 7/00
[52] U.S. Cl. ..................................... 33/558; 33/172 E
[58] Field of Search .................... 33/561, 558, 172 E, 33/169 R

[56] References Cited

U.S. PATENT DOCUMENTS

| | | |
|---|---|---|
| 4,153,998 | 5/1979 | McMurtry . |
| 4,270,275 | 7/1981 | McMurtry . |
| 4,301,338 | 11/1981 | McMurtry ...................... 33/169 R |
| 4,339,714 | 7/1982 | Ellis . |
| 4,443,946 | 4/1984 | McMurtry . |
| 4,451,988 | 6/1984 | McMurtry . |
| 4,462,162 | 7/1984 | McMurtry . |
| 4,578,873 | 4/1986 | Klingler et al. . |
| 4,702,013 | 10/1987 | McMurtry . |

FOREIGN PATENT DOCUMENTS

| | | |
|---|---|---|
| 3210711 | 3/1982 | Fed. Rep. of Germany . |
| 8504706 | 4/1985 | PCT Int'l Appl. . |
| 854706 | 10/1985 | PCT Int'l Appl. . |
| 8603829 | 7/1986 | PCT Int'l Appl. . |
| 2025073 | 6/1979 | United Kingdom . |
| 2049198 | 12/1980 | United Kingdom . |
| 1586052 | 3/1981 | United Kingdom . |

Primary Examiner—William D. Martin, Jr.
Attorney, Agent, or Firm—Parkhurst & Oliff

[57] ABSTRACT

The probe has a piezo-electric sensor (22A) for determining initial contact of a stylus (16) with a workpiece (4). It also has a kinematic support (18) made up of confronting electrical contacts (19, 20) which are connected to indicate displacement of the stylus from a rest position and correct reseating on the kinematic support. The sensor (22A) and the electrical contacts (19, 20) are connected to an electrical circuit (24) within the probe. The circuit (24) has only two terminals connecting it to an external interface (9), which both receives the signals from and supplies power to the sensor (22A) and the contacts (19, 20). This enables the receipt of a signal from the contacts (19, 20) to provide a fail-safe backup to the signal from the sensor (22A) and to indicate correct reseating of the probe, while maintaining the interface (9) compatible with prior art probes having only one workpiece-engagement sensing arrangement with two terminals.

12 Claims, 3 Drawing Sheets

CONTACT-SENSING PROBE

TECHNICAL FIELD

This invention relates to a contact-sensing probe for use in apparatus for measuring the dimensions of workpieces.

BACKGROUND ART

Contact sensing probes generally include a first, fixed part connected to a machine which supports the fixed part for movement relative to a workpiece to be measured. The probe includes a movable part, having a stylus which is intended to engage the workpiece. Support means are provided to support the movable part in a rest position on the fixed part and the movable part is displaced from the rest position when the stylus engages the workpiece. Sensing means are provided for sensing such engagement and for producing a signal to be sent to a measuring system on the machine for determining the position of the fixed part.

A contact sensing probe is known in which the contact of a stylus with a workpiece is sensed by a piezo-electric sensor and an electric circuit is provided to produce said signal from the output of the piezo-electric sensor. Examples are shown in the UK Pat. Specifications Nos. 1,586,052 and 2,049,198, and in our co-pending International Patent Application published as No. WO 86/03829.

The known probes offer increased sensitivity over probes which sense physical displacement of the stylus since they can produce a signal triggered by initial contact of the stylus with the workpiece.

DISCLOSURE OF THE INVENTION

Because of the nature of the piezo-electric sensor it relies on a sharp acceleration or shock being transmitted into the stylus on contact with the workpiece to produce a trigger signal. This means that there is a minimum speed at which the machine must drive the probe into the workpiece to produce the acceleration of the stylus on contact with the workpiece and the probe will not produce a trigger signal at speeds less than this minimum. There is thus a problem that the machine, or the probe, may be damaged if the machine continues to drive the probe towards the workpiece after the stylus has made contact therewith if no signal is produced by the probe to stop the machine.

An important requirement in a probe is that the stylus returns to its rest position after any displacement therefrom, and that the probe provides an indication as to whether or not it is seated in its rest position.

These requirements can be met by providing at least one further electric circuit which senses seating of the stylus in, or displacement of the stylus from, its rest position.

A problem arises with such probes in that in order to supply power to the two electric circuits and to supply two signals from the probe body to the machine, or to a transmission unit for wireless transmission to a machine, additional electrical connections are required on the probe body compared with probes having only a single sensing circuit. This means that the probes with dual sensing circuits are not interchangeable with the probes which have a single sensing circuit. This problem occurs whether the stylus-contact sensor is a piezo-electric sensor of a sensor of a different type e.g. capacitative, inductive or piezo-resistive.

A probe according to the present invention, as claimed in the appended claims, is provided with first electrical connections made to means which provide a signal when the probe stylus is displaced from its rest position, second electrical connections made to a stylus contact sensor to provide a signal when the stylus first contacts a workpiece, and an electrical circuit to which all of said electrical connections are connected, said circuit having only two terminals to which connections exterior to the probe may be made for supplying power to the probe and for receiving said signals.

One advantage of the probe as claimed is that because it requires only two external connections to be made to it, it is interchangeable with other probes which have only two connections to the machine or to a wireless transmission unit.

Another advantage of the probe as claimed is that the signal from the support means acts as a trigger signal for the machine in the event that the piezo-electric sensor fails to provide a signal on initial contact of the probe stylus with the workpiece. The signal from the support means also provides an indication that the stylus has re-seated in its rest position.

BRIEF DESCRIPTION OF THE DRAWINGS

Examples of the invention will now be more particularly described with reference to the accompanying drawings, in which.

DESCRIPTION OF THE PREFERRED EMBODIMENTS

Figure 1:
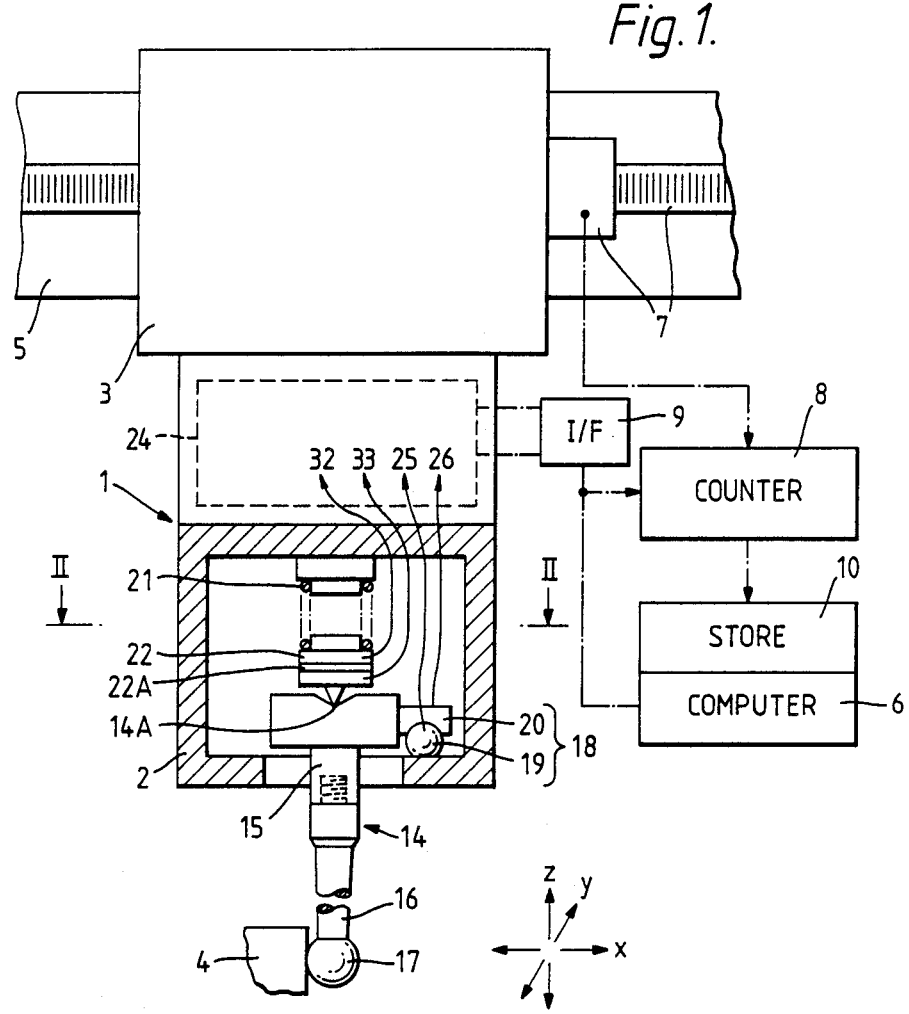
FIG. 1 is a part sectional elevation of a probe according to the invention.
Figure 2:
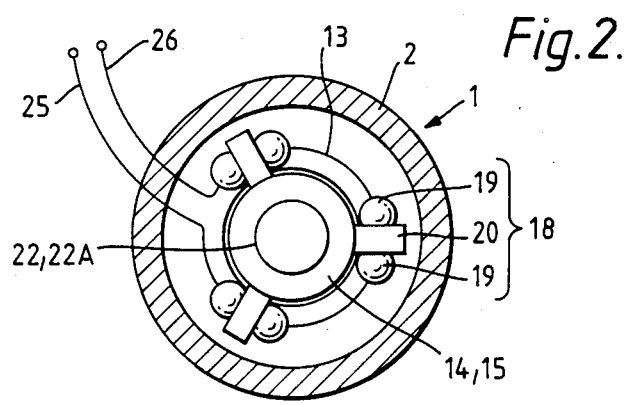
FIG. 2 is a section on the line II—II of FIG. 1.

Referring now to FIGS. 1 and 2, the probe generally denoted 1 has a first fixed part of housing 2 secured to a machine carriage 3 (known per se) for moving the probe relative to a workpiece 4 to be measured.

The carriage 3 is moveable on a track 5 of a machine under the control of a computer 6, and an opto-electronic system 7 reads the instantaneous position of the carriage along the track and communicates the reading to a counter 8 which continuously indicates the machine position. A sensor signal derived from the probe 1 on contact with the workpiece is connected via an interface unit 9 to the system 7 to signal the system to transfer to a store 10 of the computer in a manner known per se, the measurement of the carriage position at the time of receipt of the sensor signal. Thus the measuring operation comprises moving the carriage so as to engage the stylus with the workpiece and reading the content of the store.

It is to be understood that the track 5 may itself be mounted on a further track to give three dimensional movement of the probe, or the workpiece may be mounted on a movable machine table, none of which are shown but which are well known in the art.

The probe further has a second or movable part 14 comprising a stylus holder 15 to which is secured a stylus 16 having a free end 17 intended to be brought into engagement with the workpiece by the carriage during a measuring operation. A kinematic support 18 known per se, supports the movable part on the fixed part while allowing relative movement therebetween. The kinematic support is defined by confronting seat elements 19,20 provided respectively on the housing 2 and the holder 15 at three locations equally spaced around the axis of the stylus. In the particular form of kinematic support shown in FIG. 2, the seat elements 19 comprise pairs of balls and the seat elements 20 comprise cylinders extending radially from the stylus holder 15 into engagement with the balls 19. A spring 21 arranged between the parts 2 and 14 urges the part 14 into a rest position, this being the illustrated position, on the support 18. The part 14 is displaceable by a limited amount from the rest position when the stylus engages the workpiece so as to avoid collision damage between the probe and the workpiece. The spring 21 returns the part 14 to the rest position when the probe is withdrawn from the workpiece and the displacing force ceases. The ball seats 19 are electrically insulated from the housing 2, and, as can be seen in FIG. 2 they are electrically wired in series by means of a wire 13. Thus each pair of balls 19 with its associated cylinder 20 forms an electrical switch which is closed when the stylus holder 15 is in its rest position and is opened by displacement of the stylus on contact with the workpiece. Electrical connections 25 and 26 are made from the balls to signal conditioning electronics 24 to provide both a sensing signal when stylus displacement occurs, and a re-seat signal to indicate that the stylus has returned to its rest position to allow the measuring cycle to continue. The above described support is only capable of supporting the stylus for movement with 5 degrees of freedom i.e. tilting due to the application of force along orthogonal horizontal axes (the x,y axes) and upward movement due to application of force along the vertical axis (+Z axis). However, probes are known in which the stylus is also able to move downwardly along the vertical axis (−Z axis) to give it complete 6-way operation, and the invention could be simply applied to such probes.

The spring 21 acts on the part 14 through a pressure pad 22 having a conical end supporting the pad in a corresponding recess 14A in the part 14 at the centre portion thereof. The recess 14A may take any suitable form, for example it may be a circular depression or a conical seat of wider cone angle. The pad 22 includes a piezo-electric sensor 22A positioned to sense the effect produced when the stylus is brought into engagement with the workpiece, and to produce a sensor output signal which is passed, as will be described below, to the signal conditioning electronics 24.

Figure 3:
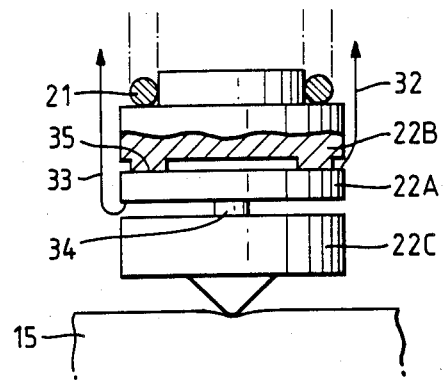
FIG. 3 is an enlarged view of an arrangement of the piezo-electric sensing element of the probe FIG. 1.

Referring now to FIG. 3 the piezo-electric sensor 22A is a flat circular ceramic element sandwiched between top and bottom parts 22B,22C of the pad 22. The piezo-electric effect is well known and can be expressed as the ability of a crystal to generate a voltage when a pressure is applied to it. The top part 22B acts as a collar for mounting the spring 21. Thus in addition to its function of providing a resilient force urging the stylus holder 15 onto its supports 19, the spring 21 provides a yielding resistance to upward movement of the peizo-electric device to enable the pressure wave to produce compression therein to produce the sensing signal. Electrical connections 32 and 33 are made to the top and bottom surfaces of the piezo-electric sensor to pass the signal to the signal conditioning electronics 24. The effectiveness of the piezo-electric sensor is increased by providing a central pressure pad 34 and an annular pressure pad 35. In an alternative arrangement (not shown) the piezo-electric sensor 22A may be directly mounted on the top surface of the stylus holder 15. The force of the spring 21 is then transmitted via a conical end on the collar 22B directly onto part 22C which is made flat and positioned on top of the sensor.

It will be understood that various positions of the piezo-electric sensor 22A are possible between the spring 21 and the stylus holder 15, with pressure pads suitably arranged to optimise the signal produced by the sensor. Some of the possible arrangements are disclosed, for example in the above-mentioned international Patent Application No. WO 86/03829. Alternatively, the sensor may be positioned on the stylus 16. In some alternative embodiments it may be convenient to make one of the electrical connections from the sensor through the spring 21 to the signal conditioning electronics 24, and to provide a second spring to form a second connection.

The piezo-electric sensor is extremely sensitive to shocks or accelerations and produces a voltage output when the stylus makes initial contact with the workpiece. However, there are occassions, for example when measuring the internal diameter of small holes, when the stylus is driven into the workpiece very slowly and the shock produced on contact is too small to be sensed by the piezo-electric sensor. Under these circumstances the machine will continue to drive the probe towards the workpiece causing displacement of the stylus and the generation of the sensing signal from the ball seats 19. This sensing signal can therefore be used not only as a fail-safe signal to prevent damage to the machine, probe, or workpiece but also gives the probe the capability of providing measurement readings, albeit less accurate ones, when the machine is operating at speeds below which the piezo-electric sensor will not produce a signal.

In order to made use of all the information provided by the two sensing arrangements of the probe that is, the piezo-electric sensor and the ball seat sensing, without additional wiring which would prevent the probe from being interchangeable with other probes, the invention provides an electrical circuit in the signal conditioning electronics 24 which combines the sensing signals in a simple and effective manner and requires that only two external electrical connections are made to the probe.

Figure 4:
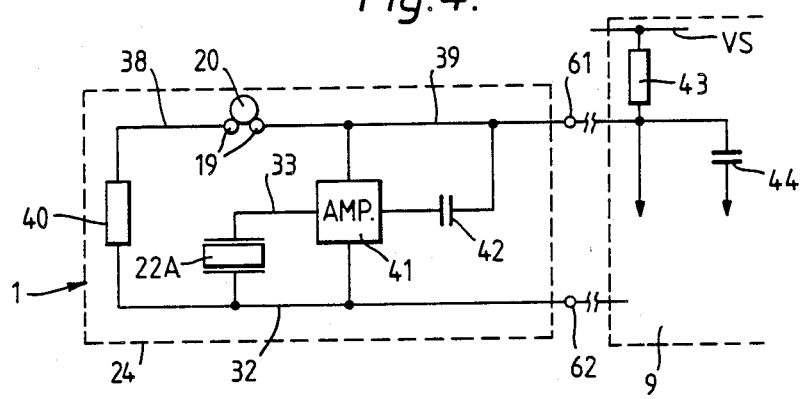
FIG. 4 is a circuit diagram showing one arrangement of the electrical connections for the probe of FIG. 1, FIGS. 5 and 6 are circuit diagrams showing two alternative arrangements of the electrical connections for the probe of FIG. 1 and, FIG. 7 is a circuit diagram of a further alternative embodiment of the invention.

One form of electrical circuit for use in the signal conditioning electronics 24 of the probe is shown in FIG. 4. In this circuit the two sensing arrangements of the probe are wired in parallel and are connected to two terminals 61 and 62 to supply power to the probe and to receive the probe output.

Considering the seat sensing arrangement, connection 39 goes to terminal 61 and connection 38 goes to terminal 62 via a high value resistor 40 to prevent a complete short circuit across the terminals 61 and 62 when the ball and cylinder switches are closed.

Considering the piezo-electric sensor 22A connection 32 goes to terminal 62 and connection 33 goes to terminal 61. An amplifier 41 is provided to amplify the sensor signal both to drive it through any cabling required between the probe and the interface unit and to improve the signal to noise ratio along the cable. The amplifier also acts as a high pass filter. The amplifier output is a.c. coupled to the terminal 61 through a capacitor 42. The signal produced by the piezo-electric sensor when the stylus contacts the workpiece is a short resonant pulse, and the pass band of the amplifier is selected to be compatible with that resonant frequency so that most of the electrical noise generated by the sensor 22A to machine and other vibrations can be eliminated from the sensor signal.

Power for the probe comes from the machine power supply through the interface, and is supplied from a power line at voltage VS through a pull-up resistor 43 as a constant d.c. voltage to terminal 61.

Operation of the circuit is as follows: While the seating elements 19,20 are in their rest position the constant d.c. current flows between the terminals 61 and 62 via the seats and resistor 40 (and in part through the amplifier 41). However, in the absence of any excitation of the piezo-electric sensor 22A, no a.c. current flows through the device.

When there is a contact of the probe stylus with the workpiece sufficient to cause a signal to be generated by the piezo-electric sensor, the a.c. sensor signal is coupled to the d.c. current at terminal 61. A de-coupling capacitor 44 in the interface senses the a.c. addition to the d.c. current and associated circuitry in the interface conditions the capacitor output for transmission of a signal to the machine to stop the machine and take a measurement reading. Should any one of the seating elements become displaced to the extent that electrical contact is broken at the seats there will be an open circuit across the terminals and the voltage at terminal 61 will increase to the supply voltage. This voltage change is sensed in the interface unit in a manner known per se, and the interface circuitry produces a signal which is conditioned for transmission to the machine.

Thus, the interface unit reacts to the different voltages occurring across the two terminals 61 and 62 to send appropriate signals to the machine depending on whether the piezo-electric sensor has triggered or whether the stylus has become displaced. The two signals from the interface could be sent separately to the machine so that it is clear which is which, or they may be combined in the interface circuitry and a separate conditioning signal produced to identify to the machine which sensing arrangement has produced the signal. In addition, after a stylus displacement signal has been received, the interface unit can be arranged to prevent further measuring activity by the machine until the original d.c. voltage is restored at terminal 61. A suitable interface circuit is described in our co-pending UK patent application No. 8621243.

Figure 5:
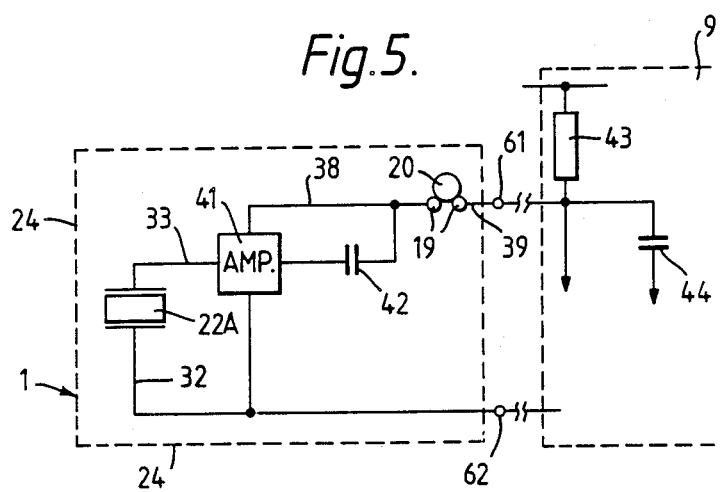

An alternative electrical circuit is shown in FIG. 5 in which the two sensing arrangements of the probe are wired in series. All of the elements of the circuit of FIG. 4 are contained in this circuit and in the interface unit with the exception of the resistor 40, and the same reference numerals are applied.

Operation of this circuit is as follows: While the seating elements 19,20 are in their rest position a d.c. current flows from terminal 61 to terminal 62 via the connection 39, balls and cylinders 19,20, connection 38 and amplifier 41. Should electrical contact be broken at the sealing element 19,20, there will be a change in the level of d.c. voltage between the terminals as before.

When there is a contact of the probe stylus with the workpiece such as to cause a signal to be generated by the piezo-electric sensor 22A, and a.c. signal will be coupled across the terminals by the capacitor 42. As previously explained these changes can be detected in the interface unit and appropriate signals sent to the machine. One disadvantage of the above-described series connected circuit is the fact that the amplifier is switched on and off every time there is a break in electrical contact at the seating elements.

Figure 6:
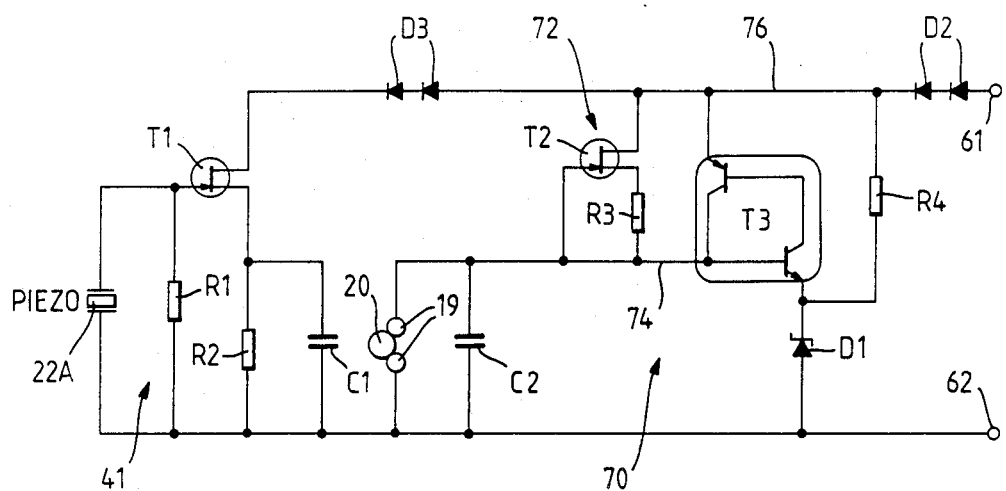

The circuits of FIGS. 4 and 5 may potentially suffer a disadvantage if the switching of the seat elements 19,20 suffer from contact bounce. Should the contact bounce occur at a frequency within the same range as the frequency of the output of the piezo-electric sensor 22A, then this contact bounce will also be passed by the capacitor 44 in the interface circuit, and it could be difficult to distinguish the piezo signal from the signal caused by the switching of the seat elements. FIG. 6 is a practical circuit diagram of an electrical arrangement in the probe which can overcome this problem.

Referring to FIG. 6, the signal from the piezo-electric sensor 22A is amplified by an amplifier 41, consisting of a field effect transistor T1, resistors R1,R2 and a capacitor C1. This amplifier is provided in parallel with a detection circuit 70 for detecting the opening of the seat elements 19,20.

The circuit 70 includes a constant current source 72, made up of a field effect transistor T2 and a resistor R3, which normally feeds a constant current through the 19,20. When the seat elements 19,20 open, however, this constant current starts to charge a capacitor C2 placed in parallel with the seat elements. The result is a rising ramp voltage at the gate input 74 of a silicon controlled rectifier (SCR) T3. The trigger threshold voltage of the SCR T3 is set by a Zener diode D1 and resistor R4. Assuming the elements 19,20 to be fully opened, the ramp voltage across capacitor C2 will continue to rise until the voltage on the electrode 74 reaches this trigger threshold. In the event of contact bounce, however, the effective reclosing of the seat elements 19,20 during the contact bounce will tend to discharge the capacitor C2. Consequently the trigger threshold will not be reached until the elements 19,20 are fully opened, and the SCR does not react to the contact bounce.

When the ramp voltage across capacitor C2 reaches the trigger threshold, the SCR T3 quickly becomes fully conductive, pulling the voltage on a connecting line 76 down to around one volt above the threshold voltage of the Zener diode D1. As previously, the terminal 61 of the probe is supplied through a low value resistor 43 in the interface (not shown in FIG. 6). When the line 76 is pulled down by the SCR T3, the voltage across this resistor 43 in the interface increases, and is easily detected in a conventional manner (although it should be noted that the SCR T3 has the effect of inverting the signal from the seat elements 19,20, compared with the arrangements of FIGS. 4 and 5).

When the seat elements 19,20 reclose, the gate electrode 74 of the SCR T3 is shorted to the earth terminal 62. This causes the SCR to turn off, so that the voltage online 76 rapidly rises again, signalling that the probe has reseated satisfactorily and is ready for the next measurement.

The AC signal from the piezo sensor 22A, coming via the amplifier 41, is also fed along the line 76 to the terminal 61, and is detectable in the interface as previously. It will be noted that this AC signal is superimposed on the DC level caused by the circuit 70 in response to the seat elements 19,20, irrespective of whether the contacts are open or closed.

A diode pair D2 is provided in the line 76, in series with the detection circuit 70, and a further diode pair D3 is in series with the amplifier 41. These diode pairs adjust the DC levels of these signals to make the present probe easier to distinguish from other probes which might be connected to the interface. Additionally, the diode pairs prevent accidental current reversal.

One further advantage of the circuit of FIG. 6 is that the charging of the capacitor C2 to the trigger voltage of the SCR T3 will always take a certain minimum length of time (typically ½ to 3 millisecond). This aids the operation of the circuit described in the above-mentioned co-pending UK Patent Application No. 8621243, which gives an indication in the case where the initial contact with the workpiece is so soft that the AC signal from the piezo sensor 22A is not detected, so that the interface reacts only to the opening of the seat elements 19,20. The circuit makes use of the time delay between the piezo signal and the signal from the seats. The inherent time delay caused by the charging of the capacitor C2 will ensure that there is always a minimum delay between the two signals, which is easily detected.

Thus, it can be seen that the probe described can provide a more sensitive signal based on initial contact of the stylus with the workpiece, while retaining a fail-safe signal caused by displacement of the seating elements from their rest position, and yet has an electrical circuit with only two terminals which enables both signals to be correctly interpreted and acted upon by machine, or an interface unit for a machine. The probe is thus interchangeable with other probes having only a single sensing system and requires only minor modification to the machine or interface electronics.

The examples given hereinbefore disclose only a piezo-electric sensor. However, with relatively minor changes in the electronics the initial contact of the stylus and a workpiece could be sensed by a piezo-resistive device, a capacitative device or an inductive device, all of which would generate signals distinctive from the signal from the seats. In the preferred embodiments the amplifier 41 and its associated capacitor 42 included in the electronics 24, are fitted in the probe body. Where space is restricted, or if convenient for other reasons, some or all of the signal conditioning electronics may be removed from within the probe itself and provided separately externally of the probe but close to it. Thus, the minimum requirements of the circuit within the probe would be the sensor 22A and its connections 32, 33, the connections 38, 39 to the seat elements 19 and in the case of a piezo-electric sensor a resistor 40 connected in parallel across the sensor. In the series-wired embodiment the resistor is required to allow for d.c. current flow through the probe, and in the parallel-wired embodiment the resistor is needed to avoid a short across the sensor when the seating elements are in their rest position.

Figure 7:
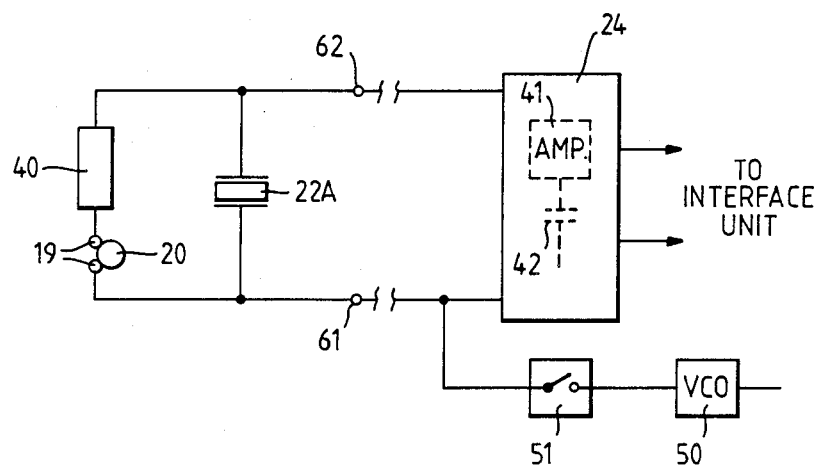

FIG. 7 shows this arrangement and it can be seen that at the two probe terminals 61 and 62 there will be an a.c. addition to the supply voltage when the piezo-electric sensor generates its signal, or a change in the d.c. level when the seat elements become displaced. These variations in voltage at the probe terminals will be sensed by the amplifier 41 and transmitted to the interface unit.

The circuit arrangement of FIG. 7 does enable a further improvement to be made in a probe using a piezo-electric sensing element in that it is possible to excite the piezo-electric sensing elements within the probe with an a.c. source to vibrate the stylus holder to which the element is connected. This vibration can be applied after a displacement of the stylus has been detected through the seat sensing arrangement and if no re-seat signal has been received when the stylus has returned to its rest position. This can happen if the seating elements have not established proper mechanical contact due to ingress of dirt between the seats or friction in the movable parts, or if despite good mechanical re-seating, a sufficient electrical contact has not been re-established at the seats.

The a.c. source is activated either continuously or intermittently to vibrate the stylus holder to re-establish both good mechanical and good electrical contact at the seats. The frequency and amplitude of the signal from the a.c. source can be chosen depending on the vibrational frequency of the movable parts to be most beneficial to aid re-seating.

In FIG. 7 the a.c. source is shown as an oscillator 50 connected through an electronic switch 51 to terminal 61, thus maintaining the two terminal arrangement. An alternative solution may however be to supply the a.c. voltage along one or more additional wires to allow more flexibility in the design of the circuit in the probe.

We claim:

1. A contact-sensing probe for use in apparatus for measuring the dimensions of workpieces, said probe comprising:
    a housing for mounting in the apparatus,
    a movable member within the housing to which is connectable a stylus for engaging a surface of a workpiece during a measuring operation,
    support means for supporting the movable member in a rest position on the housing,
    bias means arranged between the movable member and the housing for urging the movable member into said rest position on the support means while allowing displacement of the movable member relative to the housing in opposition to the bias means when the stylus engages a workpiece,
    first sensing means for sensing initial contact of the stylus with a workpiece, and providing a signal in response thereto via first electrical connections,
    second sensing means distinct from, and operably independent of, said first sensing means, for sensing support of the movable member in the rest position and displacement therefrom, and providing an electrical signal indicative thereof via second electrical connections, and
    an electrical circuit to which the first and second electrical connections are connected, said circuit having only two terminals to which connections exterior to the probe may be made, and means for transmitting said signals from the first and second sensing means via the two terminals.

2. A probe according to claim 1, wherein the first sensing means comprises a piezo-electric element.

3. A probe according to claim 1 wherein the first sensing means includes an amplifier.

4. A probe according to claim 1 wherein the second sensing means comprises confronting electrical contacts on the movable member and on the housing, said confronting contacts constituting the support means.

5. A probe according to claim 4, including a capacitor lying in a current path parallel to the confronting electrical contacts, whereby the capacitor charges when the contacts are opened.

6. A probe according to claim 1, wherein the first and second sensing means are in series with each other in said electrical circuit.

7. A probe according to claim 1, wherein the first and second sensing means are in parallel with each other in said electrical circuit.

8. A probe according to claim 1, in which said electrical circuit is arranged to conduct power to the sensing means from the two terminals.

9. A probe according to claim 1, in combination with a circuit external to the probe, said external circuit being connected to said two terminals and including means for distinguishing the signals from the first and second sensing means.

10. A probe according to claim 8, in combination with a circuit external to the probe, said external circuit being connected to said two terminals and including means for distinguishing the signals from the first and second sensing means, said external circuit also including a power supply for supplying said power to the sensing means.

11. A probe according to claim 2, wherein the second sensing means comprises confronting electrical contacts on the movable member and on the housing, said confronting contacts constituting the support means.

12. A contact-sensing probe for use in apparatus for measuring the dimensions of work pieces, said probe comprising:

a housing for mounting in the apparatus, a movable member within the housing to which is connectable a stylus for engaging a surface of a work piece during the measuring operation, support means for supporting a movable member in a rest position on the housing, bias means arranged between the movable member and the housing for urging the movable member into said rest position on the support means while allowing displacement of the movable member relative to the housing in opposition to the bias means when the stylus engages a workpiece.

first sensing means for sensing initial contact of the stylus with a work piece, and providing a signal in response thereto via first electrical connections, second sensing means distinct from, and operably independent of, said first sensing means, for sensing support of the movable member in the rest position and displacement therefrom, and providing an electrical signal indicative thereof via second electrical connections, and an electrical circuit to which the first and second electrical connections are connected, said circuit comprising means for combining the signals from the first and second sensing means so as to provide an output signal in response to the occurrence of either the signal from the first sensing means or the signal from the second sensing means, whereby the second sensing means provides a fail-safe said output signal if said first sensing means fails to produce said signal in response to initial contact.

* * * * *